United States Patent
Chung et al.

(10) Patent No.: US 8,994,211 B2
(45) Date of Patent: Mar. 31, 2015

(54) NODE REDUNDANT POWER ARCHITECTURE FOR TWO DOMAINS WITH ELECTRONIC CIRCUIT BREAKERS

(75) Inventors: Chu T. Chung, Cary, NC (US);
Jen-Ching Lin, Apex, NC (US);
Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 12/723,658

(22) Filed: Mar. 14, 2010

(65) Prior Publication Data

US 2011/0221270 A1 Sep. 15, 2011

(51) Int. Cl.
*H02J 3/06* (2006.01)
*H02J 3/00* (2006.01)
*H02J 1/10* (2006.01)

(52) U.S. Cl.
CPC .......................................... *H02J 1/10* (2013.01)
USPC ............................................... 307/19; 307/29

(58) Field of Classification Search
USPC .................................................... 307/29, 19
See application file for complete search history.

(56) References Cited

U.S. PATENT DOCUMENTS

| | | | |
|---|---|---|---|
| 6,198,642 B1 | 3/2001 | Kociecki | |
| 7,269,038 B2 | 9/2007 | Shekhawat et al. | |
| 7,400,065 B2 * | 7/2008 | Michalko | 307/44 |
| 7,548,502 B2 | 6/2009 | Hayashi | |
| 7,825,536 B2 * | 11/2010 | Jacobson et al. | 307/19 |
| 7,950,606 B2 * | 5/2011 | Atkey et al. | 244/135 R |

FOREIGN PATENT DOCUMENTS

JP 2007020308 A 1/2007

OTHER PUBLICATIONS

Raghunathan, et al.; "A Survey of Techniques for Energy Efficient On-Chip Communication"; ACM Digital Library; pp. 900-915; 2003.
Garrett, et al.; "Low Power Architecture of the Soft-Output Viterbi Algorithm"; ACM Digital Library; pp. 262-272; 2000.
IBM; "Power Distribution for Power Control Logic in Redundant Power Environments for High Availability Systems"; IP.com, IBM TDB; Nov. 11, 2004.

* cited by examiner

*Primary Examiner* — Rexford Barnie
*Assistant Examiner* — Dru Parries
(74) *Attorney, Agent, or Firm* — Damion Josephs

(57) ABSTRACT

According to one embodiment, a circuit for providing redundant power includes a first channel having a first input, a first electronic circuit breaker, and a first output, a second channel having a second input, a second electronic circuit breaker, and a second output, and a first transistor coupled to the first electronic circuit breaker, the first transistor in series with a second transistor coupled to the second channel. The circuit normally operates by providing power to the first and second outputs from the first and second channels, respectively. However, if the first channel fails, the transistors switch on to allow power from the second channel to feed the first output in the first channel in addition to feeding power to the second output, and vice versa. Other embodiments and methods for providing redundant power are described as well.

9 Claims, 3 Drawing Sheets

NODE REDUNDANT POWER ARCHITECTURE FOR TWO DOMAINS WITH ELECTRONIC CIRCUIT BREAKERS

BACKGROUND OF THE INVENTION

1. Field of the Invention

The present invention relates generally to power systems, and more particularly, to redundant node power systems.

2. Background Information

Conventional redundant node power systems generally use either an N+N scheme (1+1, 2+2 . . . power supplies in parallel) or an N+1 scheme (power supplies in parallel) from a single AC source. These conventional redundant power systems are expensive to implement and require extra space in the rack for accommodating the hardware of these power systems, thus reducing the maximum data processing capability of the rack. However, for systems that require 7×24 operations, this redundancy is required. Also, there is a problem that is encountered in using existing N+1 DC due to the difficulty in achieving AC redundancy. A known issue when using redundant power supplies is that a series ORing metal-oxide-semiconductor field-effect transistor (MOSFET) in each power supply, leads to additional power dissipation.

FIG. 1 shows a prior art parallel power system 100. As represented by the Figure, alternating current (AC) inlets AC1 and AC2 typically feed Power Train 1 and Power Train 2 in parallel, which are typically coupled to an ORing MOSFET and Electronic Circuit Breaker (ECB) Circuit. The ORing MOSFET and ECB circuit typically feed outputs J1 and J2. A Fan may be present to dissipate heat buildup in the system 100.

FIG. 2 shows a simplified schematic diagram of a prior art power system 200. The power system of this Figure has two power supplies 202, 204 connected in parallel via an ORing MOSFET 208, 210 in series with each power train respectively, and with electronic circuit breakers 216, 224 to power each domain respectively.

The problems associated with conventional systems lead to power dissipation problems, among other issues, and therefore it would be beneficial to have a redundant power system that could avoid the problems associated with conventional systems while still providing reliable power.

SUMMARY OF THE INVENTION

In one embodiment, a circuit includes a first channel comprising a first input in series with a first electronic circuit breaker and a first output, a second channel comprising a second input in series with a second electronic circuit breaker and a second output, and a first transistor coupled to a point in the first channel upstream of the first electronic circuit breaker, the first transistor in series with a second transistor coupled to a point in the second channel upstream of the second electronic circuit breaker.

According to another embodiment, a redundant node power system includes a first power train providing power to a first domain, wherein a first alternating current (AC) input couples the first power train to a first power source, and a second power train providing power to a second domain, wherein a second AC input couples the second power train to a second power source. The redundant node power system also includes a redundant circuit, wherein the redundant circuit is in series with the first power train and the second power train. The redundant circuit includes a first channel comprising a first input from the first power train in series with a first electronic circuit breaker and a first output, a second channel comprising a second input from the second power train in series with a second electronic circuit breaker and a second output, and a first transistor coupled to a point in the first channel upstream of the first electronic circuit breaker, the first transistor in series with a second transistor coupled to a point in the second channel upstream of the second electronic circuit breaker.

In another embodiment, a method for providing node redundant power includes supplying a first power to a first channel in a redundant circuit, supplying a second power to a second channel in the redundant circuit, switching the redundant circuit such that if the first channel of the redundant circuit fails to provide an adequate power, the first and second transistors switch on to allow the second channel to feed power to the first output in addition to feeding power to the second output, and switching the redundant circuit such that if the second channel of the redundant circuit fails to provide an adequate power, the first and second transistors switch on to allow the first channel to feed power to the second output in addition to feeding power to the first output. The redundant circuit includes a first channel having a first input in series with a first electronic circuit breaker and a first output, a second channel having a second input in series with a second electronic circuit breaker and a second output, and a first transistor coupled to a point in the first channel upstream of the first electronic circuit breaker, the first transistor in series with a second transistor coupled to a point in the second channel upstream of the second electronic circuit breaker.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
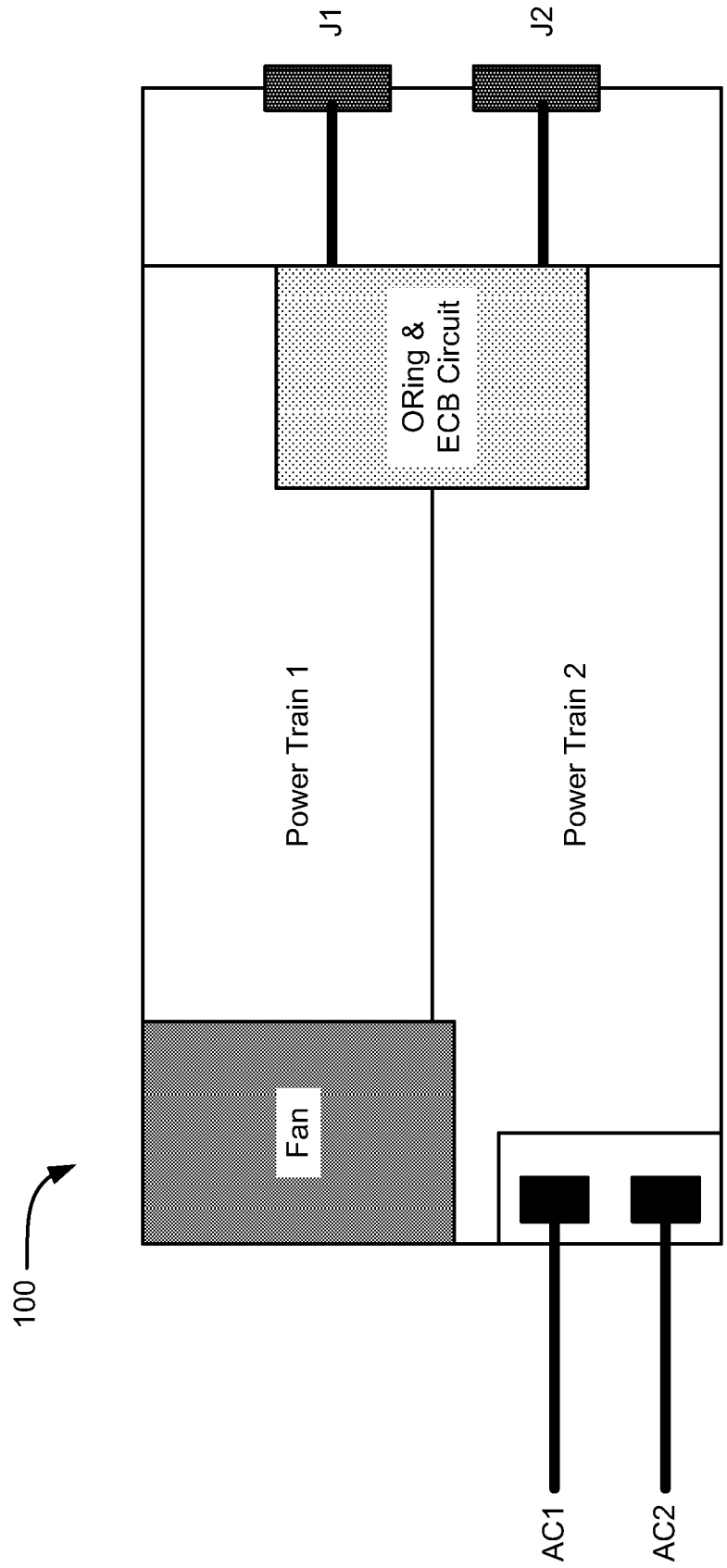
FIG. 1 is a simplified diagram of two parallel power trains each with an ORing MOSFET and an electronic circuit breaker (ECB) circuit to power independent domains respectively according to the prior art.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The embodiments described below disclose a new system for avoiding the generally expensive methods of achieving node redundancy, and reducing rack space, and reducing noise found in conventional power systems, according to some embodiments.

In one general embodiment, a circuit includes a first channel comprising a first input in series with a first electronic circuit breaker and a first output, a second channel comprising a second input in series with a second electronic circuit breaker and a second output, and a first transistor coupled to a point in the first channel upstream of the first electronic circuit breaker, the first transistor in series with a second transistor coupled to a point in the second channel upstream of the second electronic circuit breaker.

According to another general embodiment, a redundant node power system includes a first power train providing power to a first domain, wherein a first alternating current (AC) input couples the first power train to a first power source, and a second power train providing power to a second domain, wherein a second AC input couples the second power train to a second power source. The redundant node power system also includes a redundant circuit, wherein the redundant circuit is in series with the first power train and the second power train. The redundant circuit includes a first channel comprising a first input from the first power train in series with a first electronic circuit breaker and a first output, a second channel comprising a second input from the second power train in series with a second electronic circuit breaker and a second output, and a first transistor coupled to a point in the first channel upstream of the first electronic circuit breaker, the first transistor in series with a second transistor coupled to a point in the second channel upstream of the second electronic circuit breaker.

According to yet another general embodiment, a method for providing node redundant power includes supplying a first power to a first channel in a redundant circuit, supplying a second power to a second channel in the redundant circuit, switching the redundant circuit such that if the first channel of the redundant circuit fails to provide an adequate power, the first and second transistors switch on to allow the second channel to feed power to the first output in addition to feeding power to the second output, and switching the redundant circuit such that if the second channel of the redundant circuit fails to provide an adequate power, the first and second transistors switch on to allow the first channel to feed power to the second output in addition to feeding power to the first output. The redundant circuit includes a first channel having a first input in series with a first electronic circuit breaker and a first output, a second channel having a second input in series with a second electronic circuit breaker and a second output, and a first transistor coupled to a point in the first channel upstream of the first electronic circuit breaker, the first transistor in series with a second transistor coupled to a point in the second channel upstream of the second electronic circuit breaker.

Figure 2:
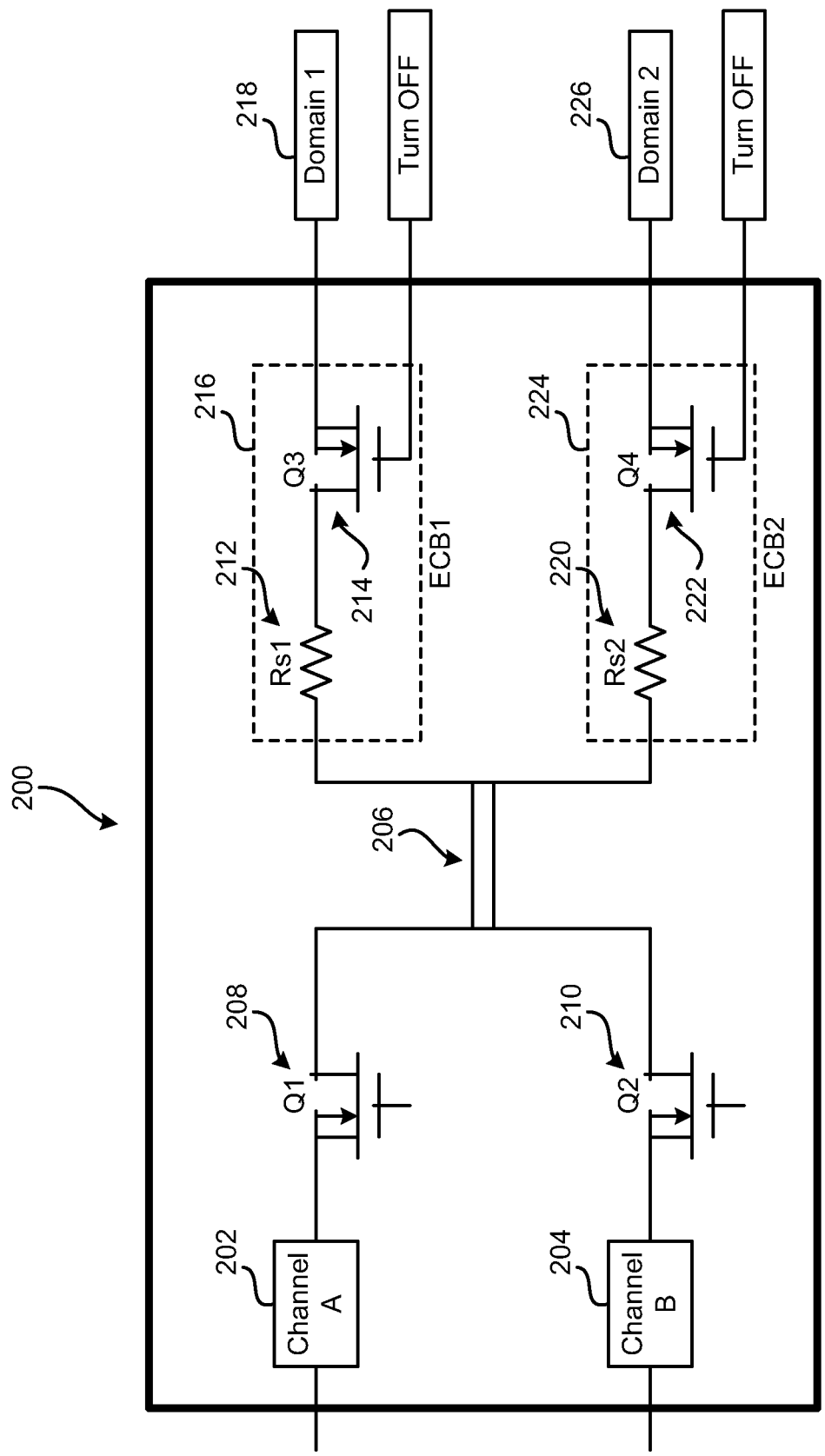
FIG. 2 is a simplified diagram of an N+N node redundant power system with ECBs capable of independently turning on/off two domains, according to the prior art.

In FIG. 2, an N+N redundant circuit 200 is shown according to the prior art. Channel A 202 and channel B 204 include MOSFETs Q1 208 and Q2 210 in series with the power path of each channel, respectively, according to the prior art. Channel A 202 and channel B 204 may be 12V channels. A bus point 206, such as a 12V bus point, is the junction point of channel A 202 and channel B 204. MOSFETs Q1 208 and Q2 210 are used to protect each channel from any short on channel A 202 and channel B 204. Current sense resistor Rs1 212 and MOSFET Q3 214 comprise an electronic circuit breaker (ECB) ECB1 216 which is used to either turn power ON or OFF to domain 1 218 or to help to ramp the voltage applied to domain 1 218 via a soft start. The operation of ECB2 224 is similar to ECB1 216 except it is used for domain 2 226. ECB2 224 includes a current sense resistor Rs2 220 and MOSFET Q4 222. The drawback of this prior art arrangement is a loss of efficiency due to power loss in the series MOSFETs Q1 208 and Q2 210 under normal operation.

According to one embodiment, the problem of power dissipation in a series switch for an N+N redundant power system is avoided by not using MOSFETs Q1 and Q2 in series with the power channel, as shown in FIG. 2. As a result of not using the MOSFETs Q1 and Q2 in series, power loss in Q1 and Q2 is avoided during normal operation. One of the advantages of this approach is that there is no loss due to series pass MOSFETs, thus improving the efficiency of the N+N power system.

Figure 3:
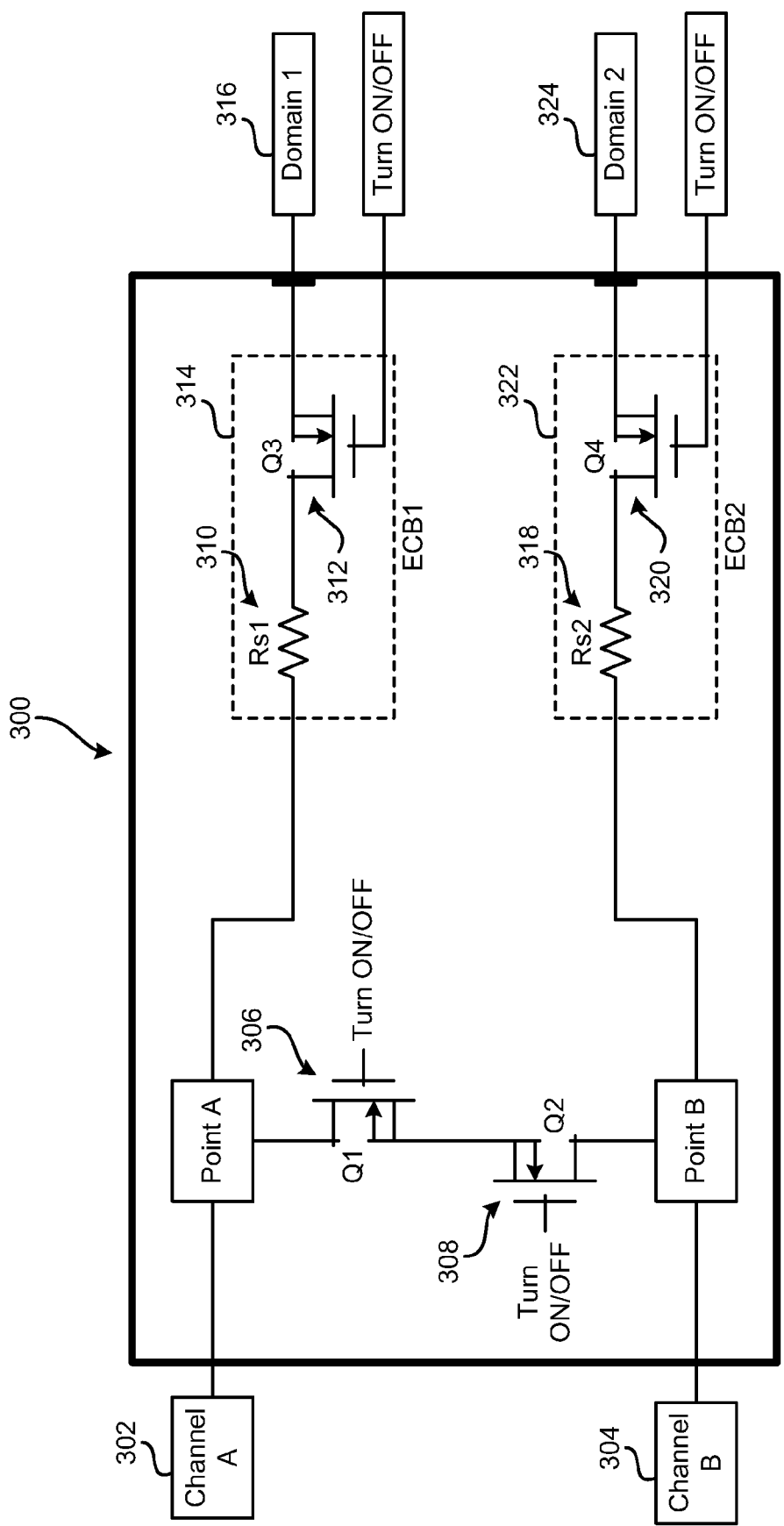
FIG. 3 is a simplified diagram of an N+N redundant power system with ECBs capable of independently turning on/off two domains, according to one embodiment.

Now referring to FIG. 3, a circuit 300 according to one embodiment is shown which avoids the power loss observed in conventional series switch designs. The circuit 300 includes two channels, Channel A 302 and Channel B 304. Each channel has an input and an output 316, 324 powering Domain 1 and Domain 2, respectively, with an ECB 314, 322 connected in series between the input and output. Additionally, according to one embodiment, upstream of the ECB's 314, 322, there is a bypass with two transistors Q1 306, Q2 308 in series.

During normal operation of the circuit 300, transistors Q1 306 and Q2 308 are switched off and power from channel A 302 and channel B 304 flow to domain 1 316 and domain 2 324, respectively, if the gate signals to Q3 312 and Q4 320 are high. If Channel A 302 fails to provide power at point A, transistors Q1 306 and Q2 308 are turned on to feed power from Channel B 304. A similar process is employed if Channel B 304 fails, allowing Channel A 302 to provide power at point B. Thus, failure of either Channel A 302 or Channel B 304 does not interrupt the power from flowing to the system at both domain 1 316 and domain 2 324. If there is a short on Channel A 302 or Channel B 304, Q1 306 and Q2 308 are kept off, thus keeping the properly functioning channel providing power to its dedicated domain (1 or 2). Thus N+N redundancy is achieved without any extra power loss in ORing MOSFETs in series with the power channel, as observed in prior art power systems.

ECB1 314 may include resistor Rs1 310 and transistor Q3 312. Also, ECB2 322 may include resistor Rs2 318 and transistor Q4 320. However, any ECB arrangement may be used as would be known to one of skill in the art. In one embodiment, transistors Q1 306 and Q2 308 may comprise MOSFETs.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:
1. A circuit, comprising:
a first channel comprising a first input in series with a first electronic circuit breaker and a first output, the first input dedicated to just a first component connected to the first output in normal operation at the first channel;
a second channel comprising a second input in series with a second electronic circuit breaker and a second output, the second input dedicated to just a second component connected to the second output in normal operation at the second output;
a first transistor coupled to a point in the first channel upstream of the first electronic circuit breaker, the first transistor in series with a second transistor coupled to a point in the second channel upstream of the second electronic circuit breaker;

a first serial path including the first input, the first output, and the first electronic circuit breaker in series with one another and not including the second input, the second output, the second electronic circuit breaker, the first transistor, or the second transistor; and a second serial path including the second input, the second output, and the second electronic circuit breaker in series with one another and not including the first input, the first output, the first electronic circuit breaker the first transistor or the second transistor, wherein during the normal operation at the first channel and during the normal operation at the second channel, the first transistor and the second transistor are turned off such that the first input is isolated from the second component and the second input is isolated from the first component, and the first serial path and the second serial path remain electrically isolated from one another, wherein during a non-electrical short failure at the first channel in that the first channel has failed and does not operate as intended in a non-electrical short manner and during the normal operation at the second channel, the first transistor and the second transistor are turned on such that the first input is not isolated from the second component and the second input is not isolated from the first component, and the first serial path and the second serial path are electrically connected to one another just through the first transistor and the second transistor between the first input and the first electronic circuit breaker at the first serial path and between the second input and the second electronic circuit breaker at the second serial path, wherein during an electrical short failure at the first channel and during the normal operation at the second channel, the first transistor and the second transistor are turned off such that the first input is isolated from the second component and the second input is isolated from the first component, and the first serial path and the second serial path remain electrically isolated from one another.

2. The circuit according to claim 1, wherein during normal operation of the circuit, the first and second transistors are switched off and power is provided to the first output from the first channel, and power is provided to the second output from the second channel.

3. The circuit according to claim 1, wherein if the first channel fails to provide an adequate power, the first and second transistors switch on to allow the second channel to feed power to the first output in addition to feeding power to the second output.

4. The circuit according to claim 3, wherein if the second channel fails to provide an adequate power, the first and second transistors switch on to allow the first channel to feed power to the second output in addition to feeding power to the first output.

5. A redundant node power system, comprising:
a first power train providing power to a first domain, wherein a first alternating current (AC) input couples the first power train to a first power source, the first AC input dedicated to powering just the first domain in normal operation of the first power train;
a second power train providing power to a second domain, wherein a second AC input couples the second power train to a second power source, the second AC input dedicated to powering just the second domain in normal operation of the second power train; and a redundant circuit, wherein the redundant circuit is in series with the first power train and the second power train, the redundant circuit comprising:
a first channel comprising a first input from the first power train in series with a first electronic circuit breaker and a first output;
a second channel comprising a second input from the second power train in series with a second electronic circuit breaker and a second output; and
a first transistor coupled to a point in the first channel upstream of the first electronic circuit breaker, the first transistor in series with a second transistor coupled to a point in the second channel upstream of the second electronic circuit breaker, wherein during the normal operation first power train and during the normal operation of the second power train, the first transistor and the second transistor are turned off such that the first AC input is isolated from the second domain so that the first AC input powers just the first domain and does not power the second domain and the second AC input is isolated from the first domain so that the second AC input powers just the second domain and does not power the first domain, wherein during a non-electrical short failure at the first power train in that the first power train has failed and does not operate as intended in a non-electrical short manner and during the normal operation of the second power train, the first transistor and the second transistor are turned on such that the first AC input is not isolated from the second domain and the second AC input is not isolated from the first domain so that the second AC input powers both the first domain and the second domain, wherein during an electrical short failure at the first AC input and during the normal operation at the second AC input, the first transistor and the second transistor are turned off such that the first AC input is isolated from the second domain and the second AC input is isolated from the first domain so that the second AC input powers just the second domain and does not power the first domain and so that the first domain is left unpowered.

6. The redundant node power system according to claim 5, wherein during normal operation, the first and second transistors of the redundant circuit are switched off and power is provided to the first output from the first channel and the second output from the second channel.

7. The redundant node power system according to claim 5, wherein if the first channel of the redundant circuit fails to provide an adequate power, the first and second transistors switch on to allow the second channel to feed power to the first output in addition to feeding power to the second output.

8. The redundant node power system according to claim 7, wherein if the second channel of the redundant circuit fails to provide an adequate power, the first and second transistors switch on to allow the first channel to feed power to the second output in addition to feeding power to the first output.

9. A method for providing node redundant power, the method comprising:
supplying a first power to a first channel in a redundant circuit;
supplying a second power to a second channel in the redundant circuit;
switching the redundant circuit such that if the first channel of the redundant circuit fails to provide an adequate power, the first and second transistors switch on to allow the second channel to feed power to the first output in addition to feeding power to the second output; and switching the redundant circuit such that if the second channel of the redundant circuit fails to provide an adequate power, a first transistor and a second transistor switch on to allow the first channel to feed power to the second output in addition to feeding power to the first output, wherein the redundant circuit comprises:
the first channel having a first input in series with a first electronic circuit breaker and a first output, the first input dedicated to just a first component connected to the first output in normal operation at the first channel;
the second channel having a second input in series with a second electronic circuit breaker and a second output, the second input dedicated to just a second component connected to the second output in normal operation of the second output; and
the first transistor coupled to a point in the first channel upstream of the first electronic circuit breaker, the first transistor in series with the second transistor coupled to a point in the second channel upstream of the second electronic circuit breaker, wherein during the normal operation at the first channel and during the normal operation at the second channel, the first transistor and the second transistor are turned off such that the first input is isolated from the second component and the second input is isolated from the first component, wherein during a non-electrical short failure at the first channel in that the first channel has failed and does not operate as intended in a non-electrical short manner and during the normal operation at the second channel, the first transistor and the second transistor are turned on such that the first input is not isolated from the second component and the second input is not isolated from the first component, wherein during an electrical short failure at the first channel and during the normal operation at the second channel, the first transistor and the second transistor are turned off such that the first input is isolated from the second component and the second input is isolated from the first component.

* * * * *